United States Patent
Chen et al.

(10) Patent No.: US 10,645,699 B2
(45) Date of Patent: *May 5, 2020

(54) SERVICE TYPE INDICATOR IN MASTER INFORMATION BLOCK (MIB)

(71) Applicant: QUALCOMM Incorporated, San Diego, CA (US)

(72) Inventors: Wanshi Chen, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,101

(22) Filed: Oct. 8, 2018

(65) Prior Publication Data

US 2019/0110283 A1 Apr. 11, 2019

Related U.S. Application Data

(63) Continuation of application No. 15/040,907, filed on Feb. 10, 2016, now Pat. No. 10,098,123.

(Continued)

(51) Int. Cl.
*H04W 72/04* (2009.01)
*H04W 72/00* (2009.01)
(Continued)

(52) U.S. Cl.
CPC ......... *H04W 72/048* (2013.01); *H04L 5/0091* (2013.01); *H04W 4/70* (2018.02);
(Continued)

(58) Field of Classification Search
CPC . H04W 72/048; H04W 4/005; H04W 72/005; H04W 24/10; H04W 28/06;
(Continued)

(56) References Cited

U.S. PATENT DOCUMENTS 9,113,465 B2 8/2015 Lee et al.
9,432,797 B2 8/2016 Xu et al.
(Continued)

FOREIGN PATENT DOCUMENTS

CN 102026372 B 3/2013
CN 102958133 A 3/2013
(Continued)

OTHER PUBLICATIONS

International Search Report and Written Opinion—PCT/US2016/017581—ISA/EPO—dated Apr. 28, 2016.
(Continued)

*Primary Examiner* — Brian T O Connor
(74) *Attorney, Agent, or Firm* — Patterson & Sheridan, LLP (57) ABSTRACT

Aspects of the present disclosure provide techniques for wireless communications by a user equipment (UE). An exemplary method, performed by a UE, generally includes receiving a physical broadcast channel (PBCH), and determining, based on a first one or more bits in the PBCH, whether a second one or more bits in the PBCH are used to indicate control information for communications related to a first type of applications or a second type of applications.

32 Claims, 6 Drawing Sheets

Related U.S. Application Data (60) Provisional application No. 62/115,114, filed on Feb. 11, 2015.

(51) Int. Cl.
| | | |
|---|---|---|
| *H04W 4/70* | (2018.01) | |
| *H04L 5/00* | (2006.01) | |
| *H04W 28/06* | (2009.01) | |
| *H04W 72/12* | (2009.01) | |
| *H04L 12/18* | (2006.01) | |
| *H04W 24/10* | (2009.01) | |

(52) U.S. Cl.
CPC ......... *H04W 72/005* (2013.01); *H04L 5/0053* (2013.01); *H04L 5/0092* (2013.01); *H04L 12/189* (2013.01); *H04W 24/10* (2013.01); *H04W 28/06* (2013.01); *H04W 72/04* (2013.01); *H04W 72/042* (2013.01); *H04W 72/12* (2013.01); *H04W 72/1268* (2013.01)

(58) Field of Classification Search
CPC ... H04W 72/12; H04W 72/042; H04W 72/04; H04W 72/1268; H04L 12/189; H04L 5/0092; H04L 5/0053; H04L 5/0091
See application file for complete search history.

(56) References Cited

U.S. PATENT DOCUMENTS

| | | | |
|---|---|---|---|
| 9,510,132 B2 | 11/2016 | Xu et al. | |
| 9,548,845 B2 | 1/2017 | Yi et al. | |
| 9,585,122 B2 | 2/2017 | Morioka et al. | |
| 9,629,183 B2 | 4/2017 | Morioka et al. | |
| 9,668,083 B2 | 5/2017 | Xu et al. | |
| 9,713,146 B2 | 7/2017 | Young et al. | |
| 9,749,771 B2* | 8/2017 | Xu | H04B 7/0413 |
| 9,820,247 B2 | 11/2017 | Xiong et al. | |
| 10,098,123 B2* | 10/2018 | Chen | H04W 4/70 |
| 2012/0327895 A1 | 12/2012 | Wallen et al. | |
| 2013/0250878 A1* | 9/2013 | Sayana | H04W 48/12 |
| | | | 370/329 |
| 2013/0301524 A1* | 11/2013 | Xu | H04W 4/70 |
| | | | 370/328 |
| 2013/0301525 A1* | 11/2013 | Xu | H04W 16/28 |
| | | | 370/328 |
| 2014/0098761 A1 | 4/2014 | Lee et al. | |
| 2014/0153516 A1 | 6/2014 | Young et al. | |
| 2015/0181575 A1 | 6/2015 | Ng et al. | |
| 2015/0181603 A1 | 6/2015 | Wakabayashi et al. | |
| 2015/0257173 A1 | 9/2015 | You et al. | |
| 2016/0227583 A1 | 8/2016 | Chavva et al. | |
| 2017/0290018 A1 | 10/2017 | Darwood et al. | |
| 2018/0041857 A1* | 2/2018 | Ouchi | H04W 72/04 |

FOREIGN PATENT DOCUMENTS

| | | |
|---|---|---|
| CN | 103929266 A | 7/2014 |
| WO | 2013043006 A1 | 3/2013 |
| WO | 2013141657 A1 | 9/2013 |
| WO | 2013169468 A1 | 11/2013 |
| WO | 2013183966 A1 | 12/2013 |
| WO | WO-2015012654 A1 | 1/2015 |

OTHER PUBLICATIONS

Samsung: "MIB for Rel-13 MTC", 3GPP Draft, R2-150413-MTC_MIB, 3rd Generation Partnership Project (3GPP), Mobile Competence Centre, 650, Route Des Lucioles, F-06921 Sophia-Antipolis Cedex, France, vol. RAN WG2, No. Athens, Greece, 20150209-20150213 Feb. 8, 2015 (Feb. 8, 2015), XP050935694, Retrieved from the Internet: URL:http://www.3gpp.org/ftp/Meetings_3GPP_SYNC/RAN2/Docs/ [retrieved on Feb. 8, 2015] p. 2.

Taiwan Search Report—TW105104326—TIPO—dated Jun. 17, 2019.

Huawei, Hisilicon: "PBCH/MIB design for MTC UEs", 3GPP TSG RAN WG1 Meeting #78bis, R1-143722, Oct. 6-10, 2014, 5 pages.

Nokia Networks et al., "MIB for MTC", R2-150130, 3GPP TSG-RAN WG2 Meeting #89, Athens, Greece, Feb. 9-13, 2015, 2 pages, Retrieved from the Internet https://www.3gpp.org/ftp/tsg_ranWG2_RL2/TSGR2_89/Docs/.

European Search Report—EP19218858—Search Authority—The Hague—dated Feb. 6, 2020.

\* cited by examiner

SERVICE TYPE INDICATOR IN MASTER INFORMATION BLOCK (MIB)

CROSS-REFERENCE TO RELATED APPLICATION(S)

The present application is a continuation of U.S. patent application Ser. No. 15/040,907, filed Feb. 10, 2016, which claims the benefit of and priority to U.S. Provisional Application Ser. No. 62/115,114, filed Feb. 11, 2015, assigned to the assignee hereof and hereby expressly incorporated by reference herein.

BACKGROUND

I. Field of the Invention

Certain aspects of the present disclosure generally relate to wireless communications and, more particularly, to obtaining a master information block (MIB) for certain wireless devices, such as machine type communication(s) (MTC) devices with coverage enhancements.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some UEs may be considered machine-type communication (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide techniques and apparatus for indicating support for one or more types of applications (within broadcast signaling) to certain devices, such as MTC devices and/or enhanced or evolved MTC (eMTC) devices.

Certain aspects of the present disclosure provide a method for wireless communications by a user equipment (UE). The method generally includes receiving a physical broadcast channel (PBCH). The method also includes determining, based on a first one or more bits in the PBCH, whether a second one or more bits in the PBCH are used to indicate control information for communications related to a first type of applications or a second type of applications.

Certain aspects of the present disclosure provide a method for wireless communications by a base station (BS). The method generally includes transmitting a PBCH. The method also includes indicating, via a first one or more bits in the PBCH, whether a second one or more bits in the PBCH are used to indicate control information for communications related to a first type of applications or a second type of applications.

Certain aspects of the present disclosure provide an apparatus for wireless communications. The apparatus generally includes means for receiving a PBCH. The apparatus also includes means for determining, based on a first one or more bits in the PBCH, whether a second one or more bits in the PBCH are used to indicate control information for communications related to a first type of applications or a second type of applications.

Certain aspects of the present disclosure provide an apparatus for wireless communications. The apparatus generally includes means for transmitting a PBCH. The apparatus also includes means for indicating, via a first one or more bits in the PBCH, whether a second one or more bits in the PBCH are used to indicate control information for communications related to a first type of applications or a second type of applications.

Certain aspects of the present disclosure provide an apparatus for wireless communications. The apparatus generally includes a receiver configured to receive a PBCH. The apparatus also includes at least one processor configured to determine, based on a first one or more bits in the PBCH, whether a second one or more bits in the PBCH are used to indicate control information for communications related to a first type of applications or a second type of applications. The apparatus further includes a memory coupled with the at least one processor.

Certain aspects of the present disclosure provide an apparatus for wireless communications. The apparatus generally includes a transmitter configured to transmit a PBCH. The apparatus also includes at least one processor configured to indicate, via a first one or more bits in the PBCH, whether a second one or more bits in the PBCH are used to indicate control information for communications related to a first type of applications or a second type of applications. The apparatus further includes a memory coupled with the at least one processor.

Certain aspects of the present disclosure provide a computer-readable medium having computer executable code stored thereon. The computer-executable code generally includes code for receiving a PBCH, and determining, based on a first one or more bits in the PBCH, whether a second one or more bits in the PBCH are used to indicate control information for communications related to a first type of applications or a second type of applications.

Certain aspects of the present disclosure provide a computer-readable medium having computer executable code stored thereon. The computer-executable code generally includes code for transmitting a PBCH, and indicating, via a first one or more bits in the PBCH, whether a second one or more bits in the PBCH are used to indicate control information for communications related to a first type of applications or a second type of applications.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Aspects of the present disclosure provide techniques that may help enable efficient communication between a base station and machine type communication (MTC) based user equipments (UEs). For example, the techniques may allow for the indication of support for one or more types of applications (within broadcast signaling) to certain devices, such as MTC devices and/or eMTC devices. The one or more types of applications may include applications related to MTC/eMTC, applications that are not related to MTC/eMTC, and/or other types of applications. For simplicity, MTC may refer to MTC, eMTC, or other versions of MTC.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
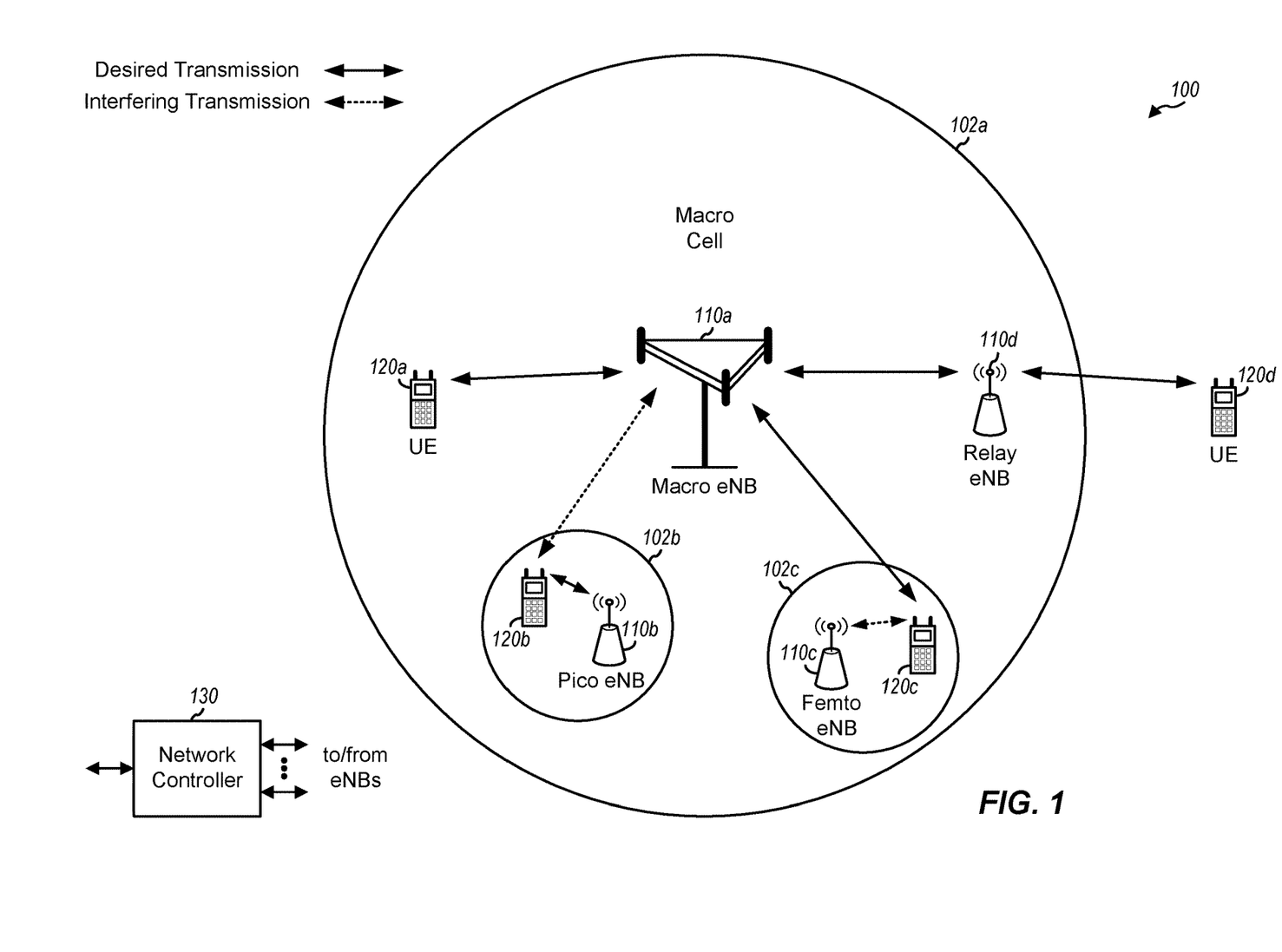
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, the techniques presented herein may be used by UEs to determine based on a first one or bits in a physical broadcast channel (PBCH) broadcasted by one or more BSs, control information for communications related to a first type of applications and/or a second type of applications.

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a station, a mobile station (MS), a subscriber unit, a station (STA), etc. Examples of UEs may include a cellular phone (e.g., smart phone), a personal digital assistant (PDA), a wireless modem, a wireless communication device, a handheld device, a laptop computer, a cordless phone, a wireless local loop (WLL) station, a tablet, a netbook, a smartbook, an ultrabook, gaming devices, navigation devices, virtual reality devices, wearable devices (e.g., smart glasses/goggles/heads-up displays, smart watch, smart wristband, smart clothing), drones, robots/robotic devices, vehicular devices, medical devices, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be low cost, low data rate devices, e.g., such as low cost MTC UEs, low cost eMTC UEs, low cost narrowband internet of things (NB-IoT) UEs, etc. MTC/eMTC UEs, for example, include sensors, meters, monitors, location tags, drones, trackers, robots/robotic devices, etc. To enhance coverage of certain devices, such as MTC devices, "bundling" may be utilized in which certain transmissions are sent as a bundle of transmissions, for example, with the same information transmitted over multiple subframes. MTC/eMTC UEs, as well as other types of UEs, may be implemented as internet of things (IoT) or internet of everything (IoE) devices, such as NB-IoT devices. The low cost UEs may co-exist with legacy and/or advanced UEs in the LTE network and may have one or more capabilities that are limited when compared to the other UEs (e.g., non-low cost UEs) in the wireless network. For example, in LTE Rel-12, when compared to legacy and/or advanced UEs in the LTE network, the low cost UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the low cost UEs may have a relaxed switching timing from transmit to receive (or from receive to transmit) operations. For example, in one case, compared to a switching timing of 20 microseconds (μs) for legacy and/or advanced UEs, the low cost UEs may have a relaxed switching timing of 1 millisecond (ms).

In some cases, the low cost UEs (e.g., in LTE Rel-12) may also be able to monitor downlink (DL) control channels in the same (or similar) way that legacy and/or advanced UEs in the LTE network monitor DL control channels. For example, the low cost UEs may monitor for wideband control channels in the first few symbols of a subframe (e.g., such as in a physical downlink control channel (PDCCH)) as well as narrowband control channels occupying a relatively narrowband, but spanning a length of a subframe (e.g., such as in an enhanced PDCCH (ePDCCH)).

The wireless communication network 100, as an alternative or in addition to supporting MTC operation, may support additional MTC enhancements (e.g., eMTC operations). For example, low cost eMTC UEs may be able to support narrowband operation (e.g., limited to a particular narrowband assignment of 1.4 MHz or six resource blocks (RBs) partitioned out of the available system bandwidth) while co-existing within a wider system bandwidth (e.g., at 1.4/3/5/10/15/20 MHz). Low cost eMTC UEs may also be able to support one or more coverage modes of operation. For example, low cost eMTC UEs may be able to support coverage enhancements up to 15 dB.

As used herein, devices with limited communication resources, such as MTC devices, eMTC devices, IoT devices, etc. are referred to generally as low cost UEs. Similarly, legacy devices, such as legacy and/or advanced UEs (e.g., in LTE) are referred to generally as non-low cost UEs.

Figure 2:
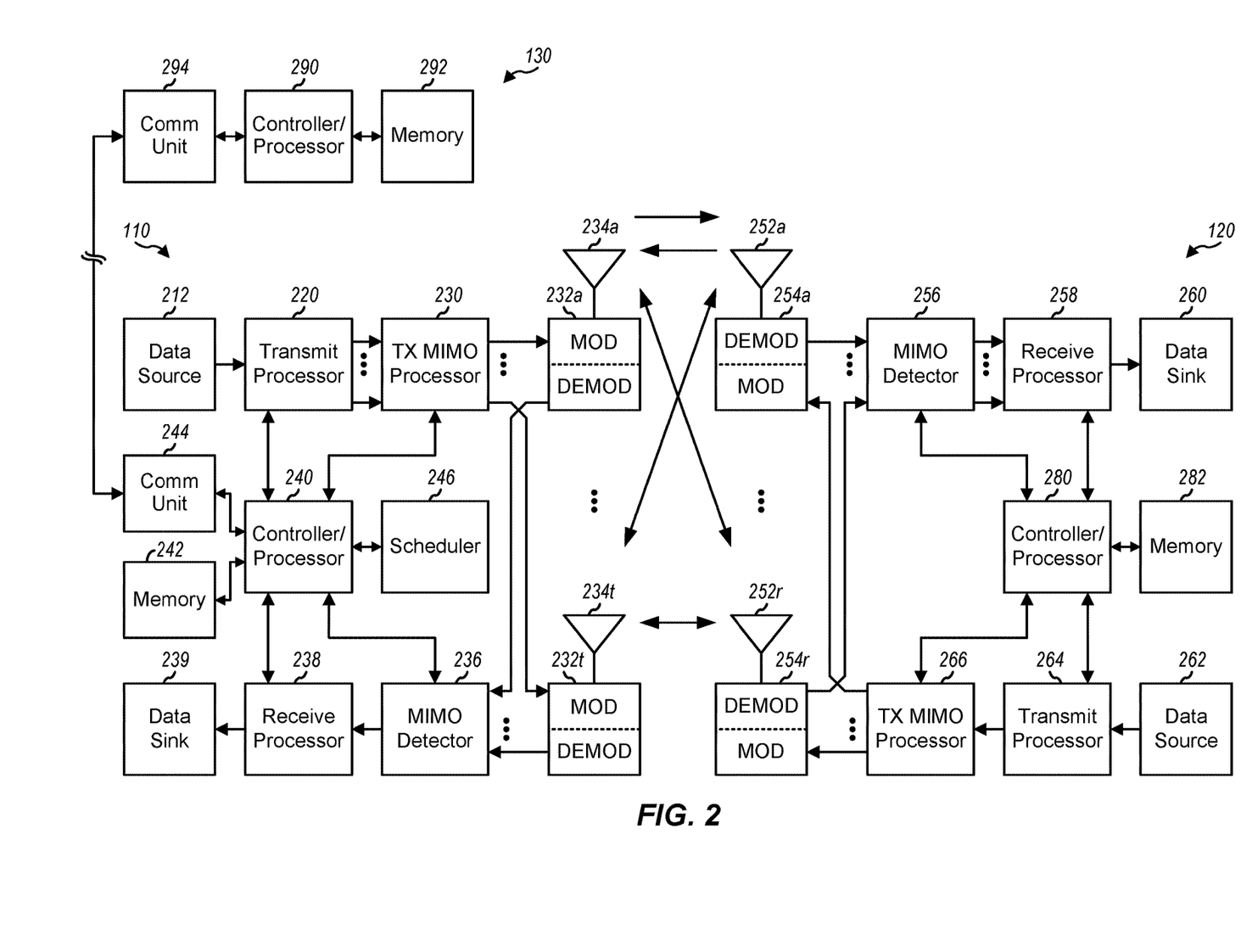
FIG. 2 shows a block diagram conceptually illustrating an example of a base station in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from BS 110 and/or other BSs and may provide received signals to demodulators (DEMODs) 254*a* through 254*r*, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254*a* through 254*r* (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations 600 illustrated in FIG. 6 and/or other processes for the techniques described herein. Similarly, controller/processor 280 and/or other processors and modules at UE 120 may perform or direct operations 500 illustrated in FIG. 5 and/or processes for the techniques described herein. Memories 242 and 282 may store data and program codes for BS 110 and UE 120, respectively. A scheduler 246 may schedule UEs for data transmission on the downlink and/or uplink.

Figure 3:
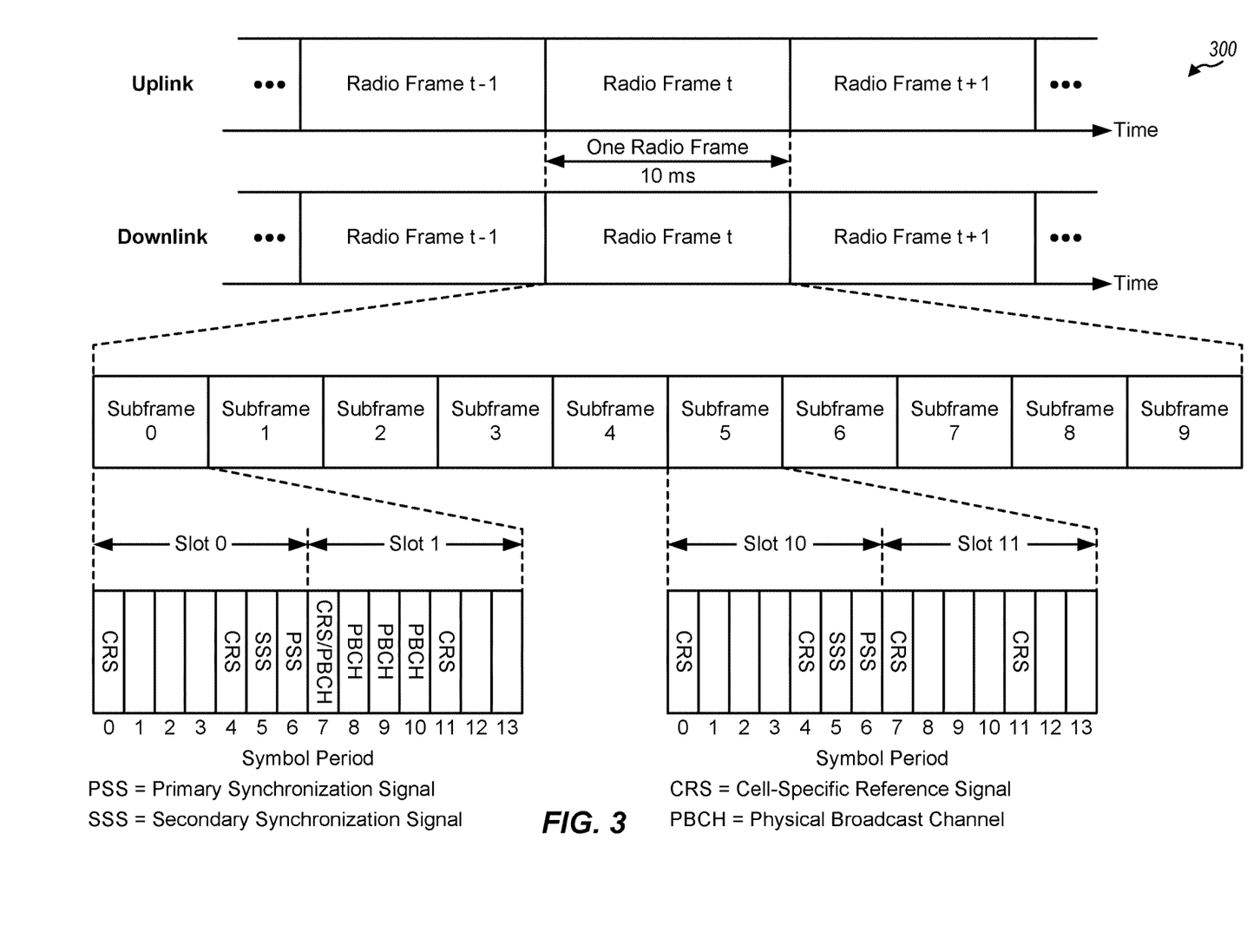
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames.

The PBCH may carry system information (e.g., the master information block (MIB)) that can be used by UEs for initial access to the cell, and the like. The MIB, carried within the PBCH, may have a payload size of twenty-four bits (e.g., before a sixteen bit cyclic redundancy check (CRC)). Eight bits of the twenty-four bits may be used for a system frame number (SFN), four bits of the twenty-four bits may be used as a system bandwidth indicator (e.g., to indicate the total bandwidth supported in the network), two bits of the twenty-four bits may be used as a physical hybrid automatic repeat request (ARQ) indicator channel (PHICH) resource indicator, one bit of the twenty four bits may be used as a PHICH time-span indicator, and nine bits of the twenty four bits may be reserved.

The eNB may also transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
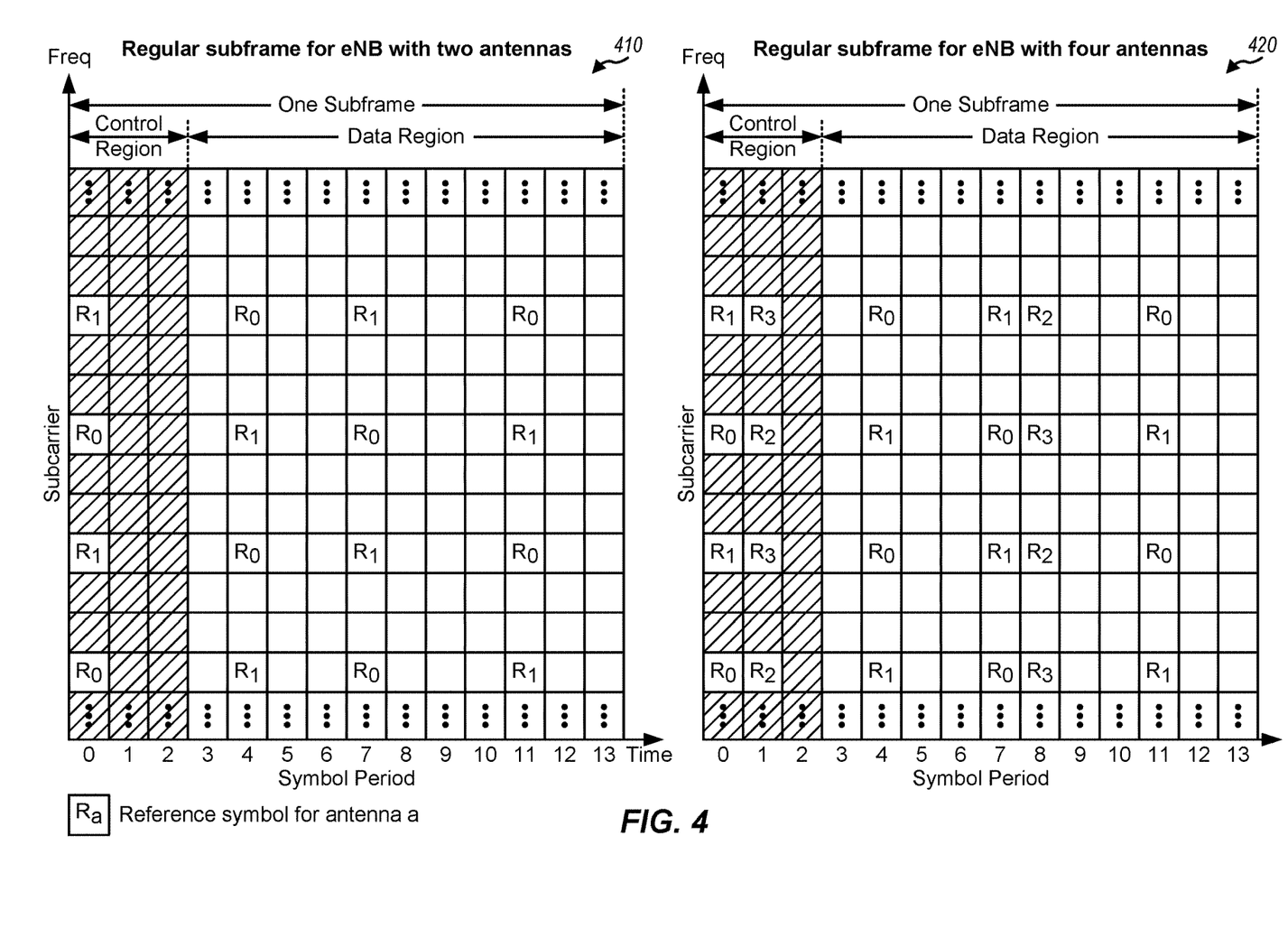
FIG. 4 is a block diagram conceptually illustrating two exemplary subframe formats with the normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as low cost UEs, as compared to other (non-low cost) devices in the wireless communication network. For example, as noted above, the low cost UE may be a link budget limited device and may operate in different modes of operation (e.g. using different numbers of repetitions for messages transmitted to or from the low cost UE) based on its link budget limitation. For example, in some cases, the low cost UE may operate in a normal coverage mode in which there is little to no repetition (e.g., the amount of repetition needed for the UE to successfully receive and/or transmit a message may be low or repetition may not even be needed). Alternatively, in some cases, the low cost UE may operate in a coverage enhancement (CE) mode in which there may be high amounts of repetition. Further, as will be described in more detail below, in some cases, non-low cost UEs may also be able to support the CE mode.

As one example of coexistence within the LTE system, low cost UEs and/or non-low cost UEs, operating under the CE mode, may be able to receive (with repetition) the PBCH. For example, the low cost UEs and/or non-low cost UEs may be able to receive the PBCH with one or more additional repetitions of the PBCH across multiple subframes (e.g., such that UEs in bad radio channel conditions are able to successfully receive and/or decode the PBCH transmitted in the cell). The repetition of PBCH may be within subframe 0 and additionally in other subframes (e.g., subframe 5, etc.).

As mentioned above, nine bits of the PBCH may be reserved. In some cases, in order to facilitate MTC and/or eMTC operation, the nine reserved bits in PBCH may be re-used for MTC and/or eMTC purposes. For example, in one implementation, possible usage of the reserved bits may include using one bit to indicate support of the CE mode, one bit to indicate support for eMTC operation (e.g., LTE Rel-13 MTC UEs), two to three bits to indicate time frequency position of broadcasting signaling for MTC and/or eMTC devices (e.g., MTC-SIB1, which may be separate from broadcasting signaling used for non-low cost UEs), two bits to indicate TBS of MTC-SIB1 and two bits to indicate a control format indicator (CFI). However, it should be noted that, for the reserved bits, other combination of bits may be supported and/or other information (or applications) indicated by the bits may be included as well.

In some cases, a sufficient number of spare bits (e.g., four to five bits) may be reserved for future use. For example, the above implementation of the reserved bits may be limited to four to five bits, such that the remaining four to five bits can be used for other types of applications (e.g., future applications).

Technique for Indicating Service Type in MIB for MTC

As mentioned above, in some cases, the use of reserved bits within MIB may be subject to a static split, such that some of the bits may be used only for MTC and some of the bits may be reserved for other future applications. In some cases, however, this static split between MTC and future applications may not be efficient.

However, in some cases, this static split between MTC and future applications may not be efficient. For example, among the reserved bits, the static split may require the following:

$$N_{MTC}+N_{Future}=9$$

where $N_{MTC}$ corresponds to the number of reserved bits used for MTC and $N_{Future}$ corresponds to the number of reserved bits used for future applications. In some cases, regardless of how the split is done between $N_{MTC}$ and $N_{Future}$, the number of reserved bits used for MTC and/or future applications may be limited.

Therefore, it may be desirable to provide an efficient way for using the reserved bits within the MIB of PBCH for both low cost UEs and non-low cost UEs.

Accordingly, aspects of the present disclosure provide techniques for indicating, with one or more bits among the reserved bits, whether one or more applications are supported.

Figure 5:
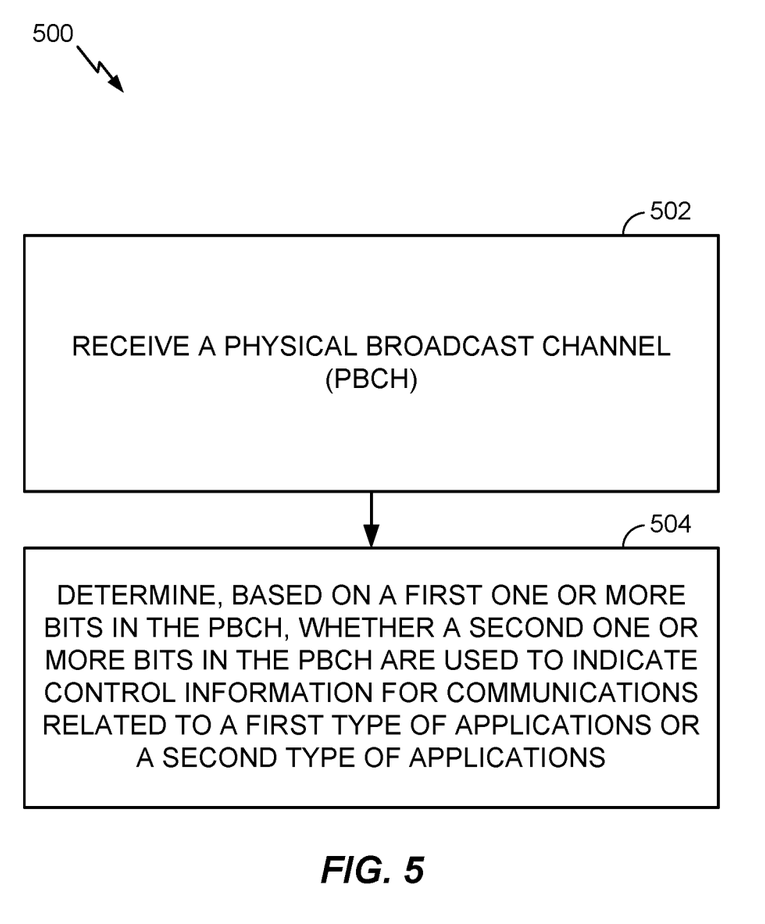
FIG. 5 illustrates example operations 500 that may be performed by a user equipment, in accordance with certain aspects of the present disclosure.

FIG. 5 illustrates example operations 500 for wireless communications, in accordance with certain aspects of the present disclosure. The operations 500 can be performed by a UE, such as an low cost UE, non-low cost UE, etc., which may be one of the UEs 120 illustrated in FIGS. 1 and 2.

The operations 500 may begin, at 502, where the UE receives a PBCH (e.g., from a BS). At 504, the UE determines, based on a first one or more bits in the PBCH, whether a second one or more bits in the PBCH are used to indicate control information for communications related to a first type of applications or a second type of applications. For example, the first type of applications may include MTC or IoT applications and the second type of applications may include non-MTC or non-IoT applications.

Figure 6:
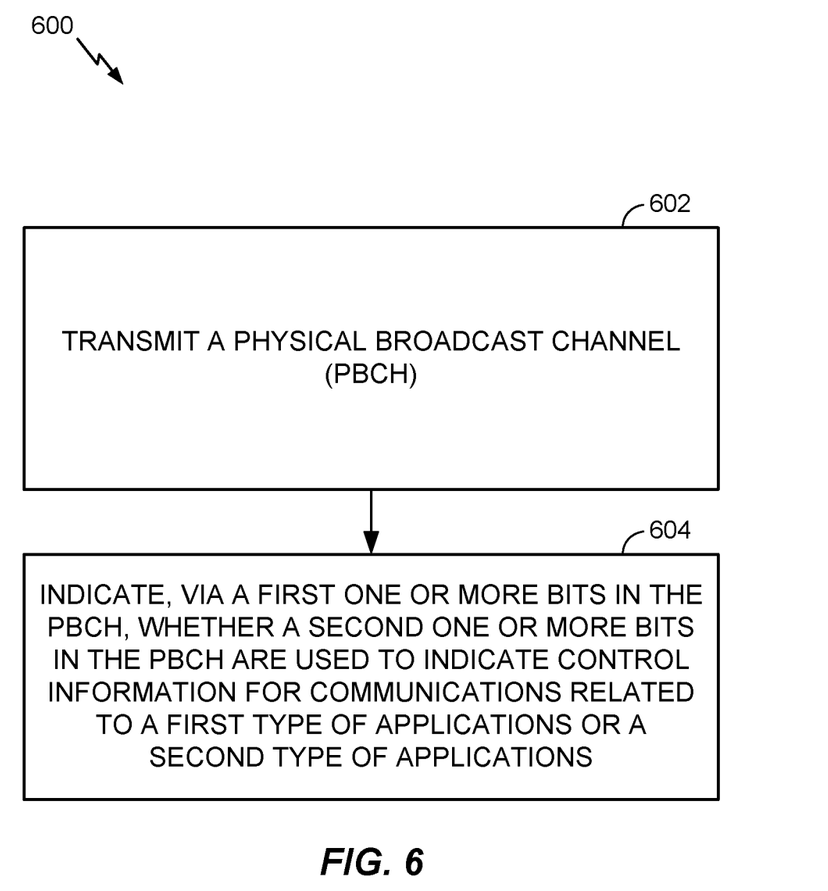
FIG. 6 illustrates example operations 600 that may be performed by a base station, in accordance with certain aspects of the present disclosure.

FIG. 6 illustrates example operations 600 for wireless communications, in accordance with certain aspects of the present disclosure. The operations 600 can be performed by a BS, such as one of the BSs/eNBs 110 illustrated in FIGS. 1 and 2.

The operations 600 may begin, at 602, where the BS transmits a PBCH (e.g., to one or more UEs, such as low cost UEs and/or non-low cost UEs). At 604, the BS indicates, via a first one or more bits in the PBCH, whether a second one or more bits in the PBCH are used to indicate control information for communications related to a first type of applications or a second type of applications. The first type of applications may include MTC or IoT applications and the second type of applications may include non-MTC or non-IoT applications.

According to certain aspects, the first one or more bits of the PBCH may include one bit. For example, among the reserved bits, the BS may use one-bit to indicate whether the remaining bits (e.g., second one or more bits) of the PBCH are for a first type of applications (e.g., which may be related to MTC/eMTC/IoT operation) or second type of applications (e.g., which may be related to non-MTC/eMTC/IoT operation).

According to certain aspects, the first one or more bits of the PBCH may include more than one bit to indicate additional types of applications. In one implementation, the first one or more bits may include at least two bits, with different combinations of bit values indicating control information for a first type of applications and/or second type of applications. For example, the different combinations of bit values may indicate MTC without coverage enhancement, MTC with coverage enhancement, non-MTC without coverage enhancement, or non-MTC with coverage enhancement. In one implementation, the BS may use two bits (e.g., as shown in Table 1) to indicate the type of services or applications supported.

TABLE 1

Example Two-Bit Service Type Indication

| Bits | Applications Supported |
|------|------------------------|
| 00   | MTC without coverage enhancement |
| 01   | MTC with coverage enhancement |
| 10   | non-MTC without coverage enhancement |
| 11   | non-MTC with coverage enhancement |

According to certain aspects, the one or more bits of the first bits may include a service indicator that indicates a purpose of one or more of the second one or more bits. For example, in certain aspects, depending on the "service indicator" (e.g., the one or more bits of the first bits), the remaining bits (e.g., the second one or more bits) may be interpreted according to the indicated service. For example, in one case, if the first two bits of the reserved bits are designated as "service indicators," the first bit of the first two bits may be a MTC or IoT indicator, and the second bit of the first two bits may be a coverage enhancement (CE) indicator.

Accordingly, in certain aspects, in the above case, based on the two bits used as service indicators, the purpose of the remaining seven bits of the reserved bits may be determined according to the following table:

TABLE 2

Example Determination of Remaining Bits Base on "Service Indication"

| Bits (First Bit, Second Bit) | Services Indicated | Purpose of Remaining Bits of the Reserved Bits |
|------------------------------|--------------------|-----------------------------------------------|
| 00 | First Bit-Non-MTC operation Second Bit-No CE mode | Seven bits reserved |
| 01 | First Bit-Non-MTC and MTC operation Second Bit-CE mode | Three bits: Time frequency position of SIB1* Two bits: TBS of SIB1* Two bits: Reserved *SIB1 may be the same or different from MTC SIB1 |
| 10 | First Bit-MTC operation Second Bit-No CE mode | Two bits: CFI Five bits: Reserved |
| 11 | First Bit-MTC operation Second Bit-CE mode | Three bits: Time frequency position of MTC SIB1 Two bits: TBS of MTC SIB1 Two bits: Reserved |

As shown in Table 2, a first combination of values of the MTC and CE indicators (e.g., "00") may indicate the second one or more bits are reserved. As also shown, a second combination of values of the MTC and CE indicators (e.g., "01" or "10" or "11") may indicate the second one or more bits are used to indicate at least one of a time frequency position of a SIB, a transport size of the SIB, control format indicator, reserved bits, etc. However, note that Table 2 illustrates merely one reference example of bits of the reserved bits that may be used as service indicators. In general, those of ordinary skill in the art will appreciate that other combination of bits and other bits (as opposed to the first two bits) of the reserved bits may be used to indicate the type of services supported.

According to certain aspects, each of the one or more BS/eNBs (e.g., illustrated in FIGS. 1 and 2) may determine the one or more bits used as the "service indicator" based on the respective BS's particular need. For example, a BS may be able to turn on supporting MTC services during night-time hours and turn off supporting MTC/IoT services during daytime hours. Other designation of services and/or other time periods may be supported as well.

According to certain aspects, one or more bits of the reserved bits may also be reserved for future applications. For example, if two bits are used as "service indicators" (e.g., one for MTC and one for CE mode), for the remaining seven bits, five bits may be used for service-dependent information field(s) and two bits may be reserved. In certain aspects, the five bits may be interpreted based on the "service indicators" (e.g., in a manner similar to that described above). In certain aspects, for the two reserved bits, one bit (which may be separate or combined with the two-bit service indicator) may be used to indicate at least a new service type. In certain aspects, the five bits used for the service dependent information field may also be interpreted based on the new service type.

According to certain aspects, the BS/eNB may broadcast the "service indicators" to the one or more UEs (e.g., low cost UEs and/or non-low cost UEs) in the wireless communication network. In certain aspects, the "service indicators" may be broadcasted such that a number of information bits of the reserved bits of the PBCH may be interpreted depending on the serving type indicator. In some cases, the number of information bits subject to interpretation based on the "service indicators" may be fixed for all service types. In some cases, the number of information bits subject to interpretation based on the "service indicators" may be different for different service types. In this case, the number of reserved bits may also be different for different services types. For example, there may be five reserved bits for service type 1 and 4 reserved bits for service type 2. Further, in some cases, there may be a certain set of reserved bits that may be common to a group of services types or to all service types. For example, there may be a two bit indicator for common search space related information. In addition, according to certain aspects, there may be one or more reserved bits that may be used for expanding the type of services indicated by the "service indicators."

According to certain aspects, it may be possible for MTC-SIB to indicate the starting symbol for broadcast channels and/or unicast channels. Accordingly, in this case, for control traffic, the starting symbol for PCFICH may follow the MTC-SIB indicated starting symbol. In some cases, for unicast control traffic, the starting symbol may be configured based on RRC signalling. For data traffic, if there is no associated control channel, the starting symbol for PCFICH may follow the MTC-SIB indicated starting symbol or a RRC configured starting symbol. Alternatively, the starting symbol may follow the starting symbol indicated in the associated control channel.

As noted above, aspects of the present disclosure provide various techniques for signalling control information for communications related to a first type of applications or a second type of applications for machine type communication devices.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually communicating a frame, a device may have an interface to communicate a frame for transmission or reception. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, data, code, or any combination thereof, whether referred to as software, firmware, middleware, code, microcode, hardware description language, machine language, or otherwise. Generally, where there are operations illustrated in Figures, those operations may be performed by any suitable corresponding counterpart means-plus-function components.

For example, means for determining may include one or more processors, such as the receive processor 258, the controller/processor 280, transmit processor 264 and/or other processors and modules of the user terminal 120 illustrated in FIG. 2. Means for receiving may include a receive processor (e.g., the receive processor 258) and/or an antenna(s) 252 of the user terminal 120 illustrated in FIG. 2. Means for transmitting may comprise a transmit processor (e.g., the transmit processor 220) and/or an antenna(s) 234 of the eNB 110 illustrated in FIG. 2. Means for indicating may include one or more processors, such as the transmit processor 220, the controller/processor 240 and/or other processors and modules of the eNB 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   receiving a physical broadcast channel (PBCH); and
   determining, based on a first one or more bits in the PBCH, whether a second one or more bits in the PBCH are used to indicate control information for communications related to a first type of applications or a second type of applications, wherein the first one or more bits or the second one or more bits comprise bits that are previously reserved.

2. The method of claim 1, wherein:
   the first type of applications comprises narrowband applications; and
   the second type of applications comprises non-narrowband applications.

3. The method of claim 2, wherein the first one or more bits comprise one bit, with different combinations of bit values indicating narrowband or non-narrowband.

4. The method of claim 2, wherein the first one or more bits comprise at least two bits, with different combinations of bit values indicating narrowband without coverage enhancement, narrowband with coverage enhancement, non-narrowband without coverage enhancement, or non-narrowband with coverage enhancement.

5. The method of claim 1, wherein one or more bits of the first one or more bits comprise a service indicator indicating a purpose of one or more bits of the second one or more bits.

6. The method of claim 1, wherein:
   a first bit of the first one or more bits comprises a narrowband indicator; and
   a second bit of the first one or more bits comprises a coverage enhancement (CE) indicator.

7. The method of claim 6, wherein:
   a first combination of values of the narrowband and CE indicators indicates the second one or more bits are reserved; and
   a second combination of values of the narrowband and CE indicators indicates the second one or more bits are used to indicate at least one of a time frequency position of a system information block (SIB), a transport block size of the SIB, or a control format indicator (CFI).

8. A method for wireless communications by a base station (BS), comprising:
   transmitting a physical broadcast channel (PBCH); and
   indicating, via a first one or more bits in the PBCH, whether a second one or more bits in the PBCH are used to indicate control information for communications related to a first type of applications or a second type of applications, wherein the first one or more bits or the second one or more bits comprise bits that are previously reserved.

9. The method of claim 8, wherein:
   the first type of applications comprises narrowband applications; and
   the second type of applications comprises non-narrowband applications.

10. The method of claim 9, wherein the first one or more bits comprise one bit, with different combinations of bit values indicating narrowband or non-narrowband.

11. The method of claim 9, wherein the first one or more bits comprise at least two bits, with different combinations of bit values indicating narrowband without coverage enhancement, narrowband with coverage enhancement, non-narrowband without coverage enhancement, or non-narrowband with coverage enhancement.

12. The method of claim 8, wherein one or more bits of the first one or more bits comprises a service indicator indicating a purpose of one or more bits of the second one or more bits.

13. The method of claim 8, wherein:
a first bit of the first one or more bits comprises a narrowband indicator; and
a second bit of the first one or more bits comprises a coverage enhancement (CE) indicator.

14. The method of claim 13, wherein:
a first combination of values of the narrowband and CE indicators indicates the second one or more bits are reserved; and
a second combination of values of the narrowband and CE indicators indicates the second one or more bits are used to indicate at least one of a time frequency position of a system information block (SIB), a transport block size of the SIB, or a control format indicator (CFI).

15. An apparatus for wireless communications, comprising:
means for receiving a physical broadcast channel (PBCH); and
means for determining, based on a first one or more bits in the PBCH, whether a second one or more bits in the PBCH are used to indicate control information for communications related to a first type of applications or a second type of applications, wherein the first one or more bits or the second one or more bits comprise bits that are previously reserved.

16. The apparatus of claim 15, wherein:
the first type of applications comprises narrowband applications; and
the second type of applications comprises non-narrowband applications.

17. The apparatus of claim 16, wherein the first one or more bits comprise one bit, with different combinations of bit values indicating narrowband or non-narrowband.

18. The apparatus of claim 16, wherein the first one or more bits comprise at least two bits, with different combinations of bit values indicating narrowband without coverage enhancement, narrowband with coverage enhancement, non-narrowband without coverage enhancement, or non-narrowband with coverage enhancement.

19. The apparatus of claim 15, wherein one or more bits of the first one or more bits comprises a service indicator indicating a purpose of one or more bits of the second one or more bits.

20. The apparatus of claim 15, wherein:
a first bit of the first one or more bits comprises a narrowband indicator; and
a second bit of the first one or more bits comprises a coverage enhancement (CE) indicator.

21. The apparatus of claim 20, wherein:
a first combination of values of the narrowband and CE indicators indicates the second one or more bits are reserved; and
a second combination of values of the narrowband and CE indicators indicates the second one or more bits are used to indicate at least one of a time frequency position of a system information block (SIB), a transport block size of the SIB, or a control format indicator (CFI).

22. An apparatus for wireless communications, comprising:
means for transmitting a physical broadcast channel (PBCH); and
means for indicating, via a first one or more bits in the PBCH, whether a second one or more bits in the PBCH are used to indicate control information for communications related to a first type of applications or a second type of applications, wherein the first one or more bits or the second one or more bits comprise bits that are previously reserved.

23. The apparatus of claim 22, wherein:
the first type of applications comprises narrowband applications; and
the second type of applications comprises non-narrowband applications.

24. The apparatus of claim 23, wherein the first one or more bits comprise one bit, with different combinations of bit values indicating narrowband or non-narrowband.

25. The apparatus of claim 23, wherein the first one or more bits comprise at least two bits, with different combinations of bit values indicating narrowband without coverage enhancement, narrowband with coverage enhancement, non-narrowband without coverage enhancement, or non-narrowband with coverage enhancement.

26. The apparatus of claim 22, wherein one or more bits of the first one or more bits comprises a service indicator indicating a purpose of one or more bits of the second one or more bits.

27. The apparatus of claim 22, wherein:
a first bit of the first one or more bits comprises a narrowband indicator; and
a second bit of the first one or more bits comprises a coverage enhancement (CE) indicator.

28. The apparatus of claim 27, wherein:
a first combination of values of the narrowband and CE indicators indicates the second one or more bits are reserved; and
a second combination of values of the narrowband and CE indicators indicates the second one or more bits are used to indicate at least one of a time frequency position of a system information block (SIB), a transport block size of the SIB, or a control format indicator (CFI).

29. An apparatus for wireless communications, comprising:
a receiver configured receive a physical broadcast channel (PBCH);
at least one processor;
memory coupled with the at least one processor; and
instructions stored in the memory and executable by the at least one processor to cause the apparatus to determine, based on a first one or more bits in the PBCH, whether a second one or more bits in the PBCH are used to indicate control information for communications related to a first type of applications or a second type of applications, wherein the first one or more bits or the second one or more bits comprise bits that are previously reserved.

30. An apparatus for wireless communications, comprising:
a transmitter configured to transmit a physical broadcast channel (PBCH);
at least one processor;
memory coupled with the at least one processor; and
instructions stored in the memory and executable by the at least one processor to cause the apparatus to indicate, via a first one or more bits in the PBCH, whether a second one or more bits in the PBCH are used to indicate control information for communications related to a first type of applications or a second type of applications, wherein the first one or more bits or the second one or more bits comprise bits that are previously reserved.

31. A non-transitory computer-readable medium for wireless communications by a user equipment (UE), the non-transitory computer-readable medium having computer-executable code stored thereon, comprising:

code for receiving a physical broadcast channel (PBCH); and code for determining, based on a first one or more bits in the PBCH, whether a second one or more bits in the PBCH are used to indicate control information for communications related to a first type of applications or a second type of applications, wherein the first one or more bits or the second one or more bits comprise bits that are previously reserved.

32. A non-transitory computer-readable medium for wireless communications by a base station (BS), the non-transitory computer-readable medium having computer-executable code stored thereon, comprising:

code for transmitting a physical broadcast channel (PBCH); and code for indicating, via a first one or more bits in the PBCH, whether a second one or more bits in the PBCH are used to indicate control information for communications related to a first type of applications or a second type of applications, wherein the first one or more bits or the second one or more bits comprise bits that are previously reserved.

* * * * *